May 24, 1960  E. L. SCHEIDENHELM  2,937,488
SHIELD ATTACHMENT FOR HARVESTER REEL BATS
Filed March 3, 1958  2 Sheets-Sheet 1

INVENTOR.
Earl L. Scheidenhelm
BY

May 24, 1960    E. L. SCHEIDENHELM    2,937,488
SHIELD ATTACHMENT FOR HARVESTER REEL BATS
Filed March 3, 1958    2 Sheets-Sheet 2
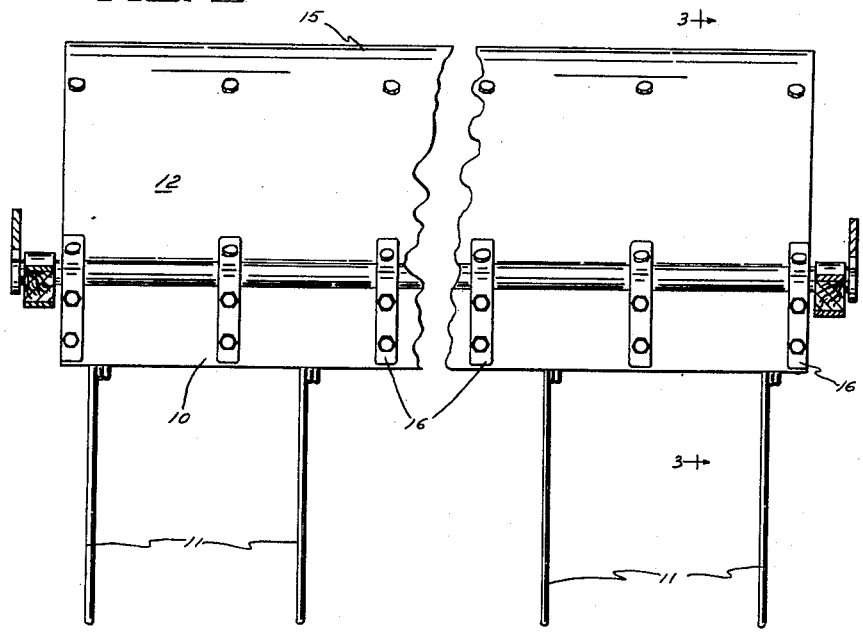
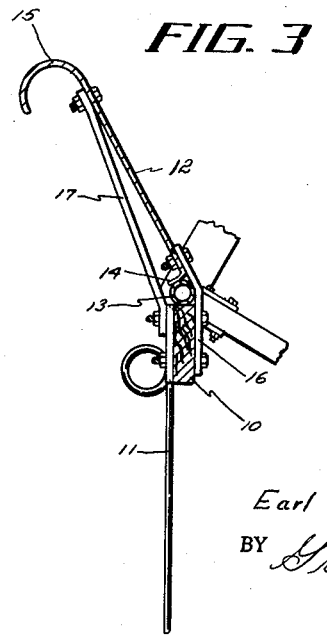
INVENTOR.
Earl L. Scheidenhelm

United States Patent Office 2,937,488
Patented May 24, 1960

2,937,488

SHIELD ATTACHMENT FOR HARVESTER REEL BATS

Earl L. Scheidenhelm, Mendota, Ill., assignor to Horace D. Hume, Mendota, Ill.

Filed Mar. 3, 1958, Ser. No. 718,593

4 Claims. (Cl. 56—226)

This invention relates to a shield attachment for harvester reel bats. It is the purpose of my invention to provide a shield attachment to the bats of a harvester reel which extends the surface contacted by the stalks of the crop and provides a gentle curve for the stalk to contact, thus to prevent breaking of the stalks and consequent loss or shattering of the seed heads.

My invention is embodied in a harvester reel that uses pick up fingers on the reel bats to extend down into down or tangled crops and sweep the down stalks back onto the draper or pan behind the cutter of the harvester. The shields preferably extend upwardly from the tops of the bats that carry the fingers, so that when rising they just clear the fingers of the preceding bat. They are inclined rearwardly from the plane of the bat and fingers.

The nature of my invention and its advantages will appear more fully from the following description and the accompanying drawings illustrating a preferred form of the invention. The drawings and description are illustrative only, however, and are not intended to limit the invention except insofar as it is limited by the claims.

In the drawings:

Figure 2 is an enlarged side view of one of the reel bats with the fingers and shield attached thereto, and Figure 3 is a sectional view taken substantially on the line 3—3 of Figure 2.

Figure 1:
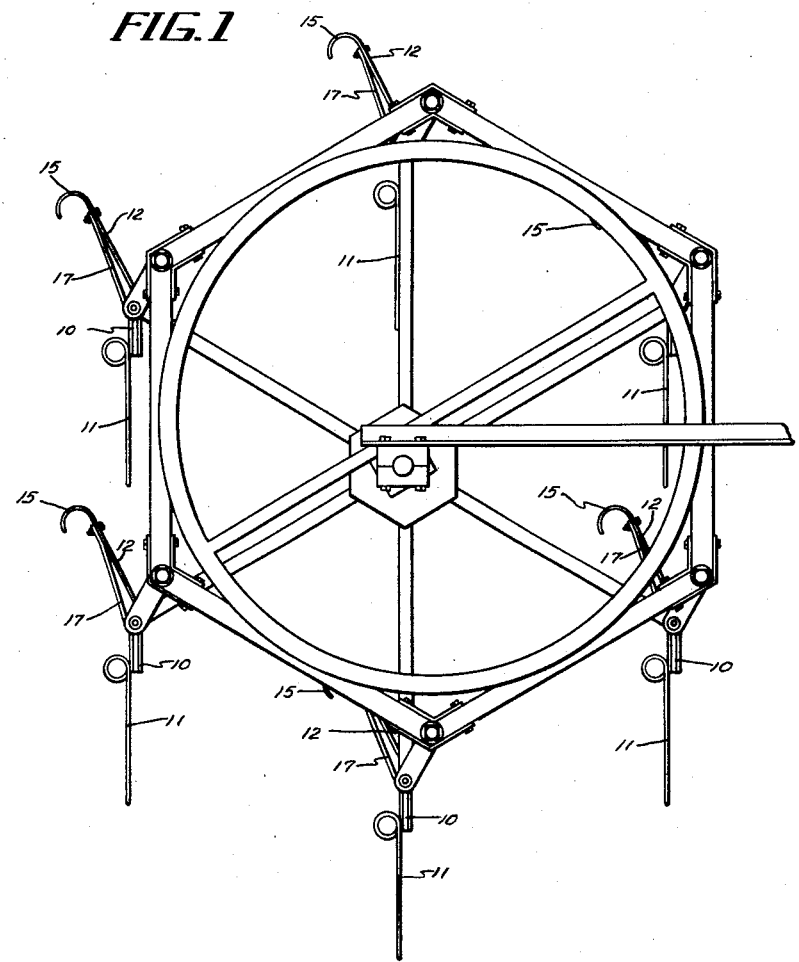
Figure 1 is an end view of a harvester reel embodying my invention.

Referring now to the drawings, my invention is shown applied to the reel bats 10 of a reel. These bats also carry pick up fingers 11. The bats are controlled by rotation of the reel, in the manner described in U.S. Patent No. 2,644,289, dated July 7, 1953, to Horace D. Hume, so as to keep the fingers 11 pointed downward. The invention is not limited to the pick up finger type of reel, although it cooperates particularly well with the fingers and bats in such reels to avoid breakage of the grain stalks and tangling of the crop on the bats.

I provide each bat with a thin metal shield 12 which is stiffened by having one side portion formed to provide a flange 14 at the bat engaging edge, bent away from the shield plane to lie against the tube 13 which is the mounting member of the bat 10. The flange 14 preferably extends the full length of the shield 12. The shield 12 has rearwardly curved nose portion 15 remote from the bat 10. The free edge of the nose portion is faced toward the bat 10. The shield 12 is secured to the bat 10 so as to provide a smooth crop engaging face that recedes from the plane of the bat at an angle of about 30 degrees. Front straps 16 form shield securing means that are bolted to the bat 10 and to the shield 12 to secure the shield flange 14 against the pipe 13. Rear straps 17 form shield bracing and securing means that are bolted to the bat 10 and to the shield 12 at the point where the nose portion 15 begins to curve rearwardly.

The shield 12 forms an upstanding face inwardly of the bat with respect to the circular path the bat follows, and the face gradually recedes toward its free nose portion 15 from the bat. When the bat moves against the stalks of crops the stalks often are inclined to whip toward the bat and break above or at the top of the bat. Then they fall down beyond the bat, and are lost, or, if the break is not complete, they hang on the bat. They may fall off at the wrong time to be recovered by the draper or other pick up device used with the reel. The breaking shatters the heads to release the seeds of the crop and the seeds often are lost. With my shields on the bats the smooth receding surface above the bat provides a stop for the grain stalks and heads so they do not break over and get lost behind the bats. If the heads are shattered, the seeds go down rearwardly of the bat and thus are in position to be recovered on the draper. Even tall stalks that drape over the curved nose are less apt to break and be lost.

It is believed that the nature and advantages of my invention will be understood from the foregoing description and accompanying drawings.

I claim:

1. In a harvester reel having a plurality of bats thereon adapted to engage a standing crop and moving it rearwardly, by rotation of the reel, a reel bat attachment comprising a shield having a side portion in juxtaposition to the bat, the shield having a crop engaging face extending from said bat and provided with a curved nose portion curved away from the crop engaging face and spaced from the first named side portion, the nose portion and face presenting a smooth receding surface to stalks engaging the bat, and means affixing the shield to the bat.

2. The invention defined in claim 1 wherein the said means comprises securing means engaging the crop engaging face of the shield adjacent to the bat and secured to the bat and bracing and securing means on the side of the shield opposite the crop engaging face extending from the bat substantially to said nose portion.

3. The invention defined in claim 1 wherein the side portion comprises a flange bent away from the plane of the shield.

4. The invention defined in claim 1 wherein the crop engaging face of the shield diverges from the plane of the bat from the bat to the nose portion of the shield.

References Cited in the file of this patent

UNITED STATES PATENTS

| | | |
|---|---|---|
| 2,332,025 | Stone et al. | Oct. 19, 1943 |
| 2,644,288 | Henthorn | July 7, 1953 |
| 2,644,289 | Hume | July 7, 1953 |
| 2,686,396 | Hill et al. | Aug. 17, 1954 |